(12) United States Patent
Modad et al.

(10) Patent No.: US 8,819,080 B2
(45) Date of Patent: Aug. 26, 2014

(54) SYSTEM AND METHOD FOR COLLECTION, RETRIEVAL, AND DISTRIBUTION OF DATA

(75) Inventors: Chad Modad, Houston, TX (US); Don M. O'Connell, Renton, WA (US)

(73) Assignee: The Boeing Company, Chicago, IL (US)

( * ) Notice: Subject to any disclaimer, the term of this patent is extended or adjusted under 35 U.S.C. 154(b) by 423 days.

(21) Appl. No.: 11/762,437

(22) Filed: Jun. 13, 2007

(65) Prior Publication Data

US 2008/0313207 A1 Dec. 18, 2008

(51) Int. Cl.
*G06F 17/30* (2006.01)

(52) U.S. Cl.
CPC .............................. *G06F 17/30525* (2013.01)
USPC .......................................... 707/803; 707/809

(58) Field of Classification Search
USPC .............. 707/102, 101, 3, 100, 201, 999.001, 707/999, 999.003, 999.201, 999.1, 661, 707/803, 809; 717/136–161; 382/100; 348/207.1; 709/204, 206, 221, 225
See application file for complete search history.

(56) References Cited

U.S. PATENT DOCUMENTS

| | | | |
|---|---|---|---|
| 6,324,581 B1 * | 11/2001 | Xu et al. ........................ 709/229 |
| 6,564,218 B1 * | 5/2003 | Roth ..................................... 1/1 |
| 6,732,124 B1 * | 5/2004 | Koseki et al. ......................... 1/1 |
| 6,760,721 B1 * | 7/2004 | Chasen et al. ..................... 707/3 |
| 7,222,147 B1 * | 5/2007 | Black et al. .................... 709/200 |
| 7,496,578 B2 * | 2/2009 | O'Brien et al. ...................... 1/1 |
| 7,627,557 B2 * | 12/2009 | McRoberts et al. .................. 1/1 |
| 8,074,041 B2 * | 12/2011 | Clark et al. .................... 711/170 |
| 8,306,979 B2 * | 11/2012 | Mao et al. ..................... 707/736 |
| 8,364,720 B2 * | 1/2013 | Levy ............................. 707/803 |
| 2005/0055372 A1 * | 3/2005 | Springer et al. ........... 707/104.1 |
| 2005/0055385 A1 * | 3/2005 | Sinha et al. .................... 707/203 |
| 2005/0203931 A1 * | 9/2005 | Pingree et al. ................ 707/100 |
| 2006/0036568 A1 * | 2/2006 | Moore et al. ...................... 707/1 |
| 2006/0069681 A1 * | 3/2006 | Lauper ............................... 707/6 |
| 2006/0117073 A1 * | 6/2006 | Bosworth et al. ............. 707/201 |
| 2006/0221190 A1 * | 10/2006 | Limberis et al. ........... 348/207.1 |
| 2006/0235869 A1 * | 10/2006 | Nagahashi et al. ........... 707/102 |
| 2007/0038822 A1 * | 2/2007 | Correl .......................... 711/162 |
| 2007/0073694 A1 * | 3/2007 | Picault et al. ..................... 707/9 |
| 2007/0143357 A1 * | 6/2007 | Chaudhri ...................... 707/201 |
| 2007/0248241 A1 * | 10/2007 | Nagao ........................... 382/100 |
| 2008/0033985 A1 * | 2/2008 | Aronow et al. ............... 707/102 |
| 2008/0065668 A1 * | 3/2008 | Spence et al. ................. 707/101 |
| 2008/0133706 A1 * | 6/2008 | Chavez et al. ................ 709/218 |
| 2008/0154907 A1 * | 6/2008 | Prasad et al. .................... 707/10 |
| 2008/0168449 A1 * | 7/2008 | Rice et al. ..................... 718/102 |
| 2008/0215581 A1 * | 9/2008 | Messing et al. ................... 707/6 |
| 2009/0070285 A1 * | 3/2009 | Kobayashi ........................ 707/1 |

* cited by examiner

*Primary Examiner* — Jacob F Bétit
*Assistant Examiner* — Bao Tran
(74) *Attorney, Agent, or Firm* — Charles L. Moore; Moore & Van Allen PLLC

(57) ABSTRACT

A system may include a data collector to collect data from at least one data source and to tag each group of collected data with a metadata tag. The metadata tag may include information about the collected data. The system may also include a metadata catalogue for containing a plurality of metadata tags and to allow a search for existence and a location on a network of any data corresponding to the search.

34 Claims, 6 Drawing Sheets

SYSTEM AND METHOD FOR COLLECTION, RETRIEVAL, AND DISTRIBUTION OF DATA

BACKGROUND OF THE INVENTION

The present invention relates to collecting, retrieving and distributing data and more particularly to a system and method for collection, retrieval and distribution of data in an efficient manner.

The amount of data being collected, retrieved and distributed over systems or networks is growing at a faster rate than such systems or networks can efficiently handle. Networks are getting faster but the number of clients or data consumers, the number of different places the data may need to be sent, the timeliness of receipt of the data, and the amount or volume of data produced is ever increasing as well. This situation is exacerbated by environments that include unreliable communications, low-bandwidth connections or links, ad-hoc nature of network connections and topology, and other inefficiencies and environmental limitations. For example, intelligence, surveillance, and reconnaissance (ISR) data may be collected by equipment in remote areas without a reliable high bandwidth communications structure. The challenge is how to collect and store large amounts of ISR data or other data while making those consuming the data aware of its existence, making the data accessible in a timely manner, controlling the distribution across limited network sizes and availabilities, providing access to the right data by the right people or entities, as well as other challenges.

BRIEF SUMMARY OF THE INVENTION

In accordance with an embodiment of the present invention, a system for collection, retrieval and distribution of data may include a data collector to collect data from at least one data source and to tag each group of collected data with a metadata tag. The metadata tag may include information about the collected data. The system may also include a metadata catalogue for containing a plurality of metadata tags and to allow a search for existence and a location on a network of any data corresponding to the search.

In accordance with another embodiment of the present invention, a system for collection, retrieval, and distribution of data may include a configurable distributed data collection and caching structure including a plurality of data collection nodes. Each data collection node may include a data collector to collect data from at least one data source and to tag each group of collected data with a metadata tag. The metadata tag may include information about the collected data. The system may also include at least one metadata catalogue node. The metadata catalogue node may include a metadata catalogue data store for storing a plurality of metadata tags. The metadata catalogue node may also include a metadata catalogue query services module to receive and respond to a query from a data consumer. A response to the query may include metadata indicating the existence and location in the system of data corresponding to the query.

In accordance with another embodiment of the present invention, a method for collection, retrieval, and distribution of data may include collecting data from at least one data source. The method may also include tagging each group of collected data with a metadata tag that includes at least one of a location of the data associated with the metadata tag on the system, a description of the data associated with the metadata tag, and a summary of the data associated with the metadata tag. The method may further include forming a metadata catalogue containing a plurality of metadata tags to allow a search for existence and a location of any data corresponding to the search.

In accordance with another embodiment of the present invention, a computer program product for collection, retrieval, and distribution of data may include a computer usable medium having computer usable program code embodied therewith. The computer usable medium may include computer usable program code configured to collect data from at least one data source. The computer usable medium may also include computer usable program code configured to tag each group of collected data with a metadata tag that includes at least one of a location of the data associated with the metadata tag on the system, a description of the data associated with the metadata tag, and a summary of the data associated with the metadata tag. The computer usable medium may also include computer usable program code configured to form a metadata catalogue containing a plurality of metadata tags to allow a search for existence and a location of any data corresponding to the search.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
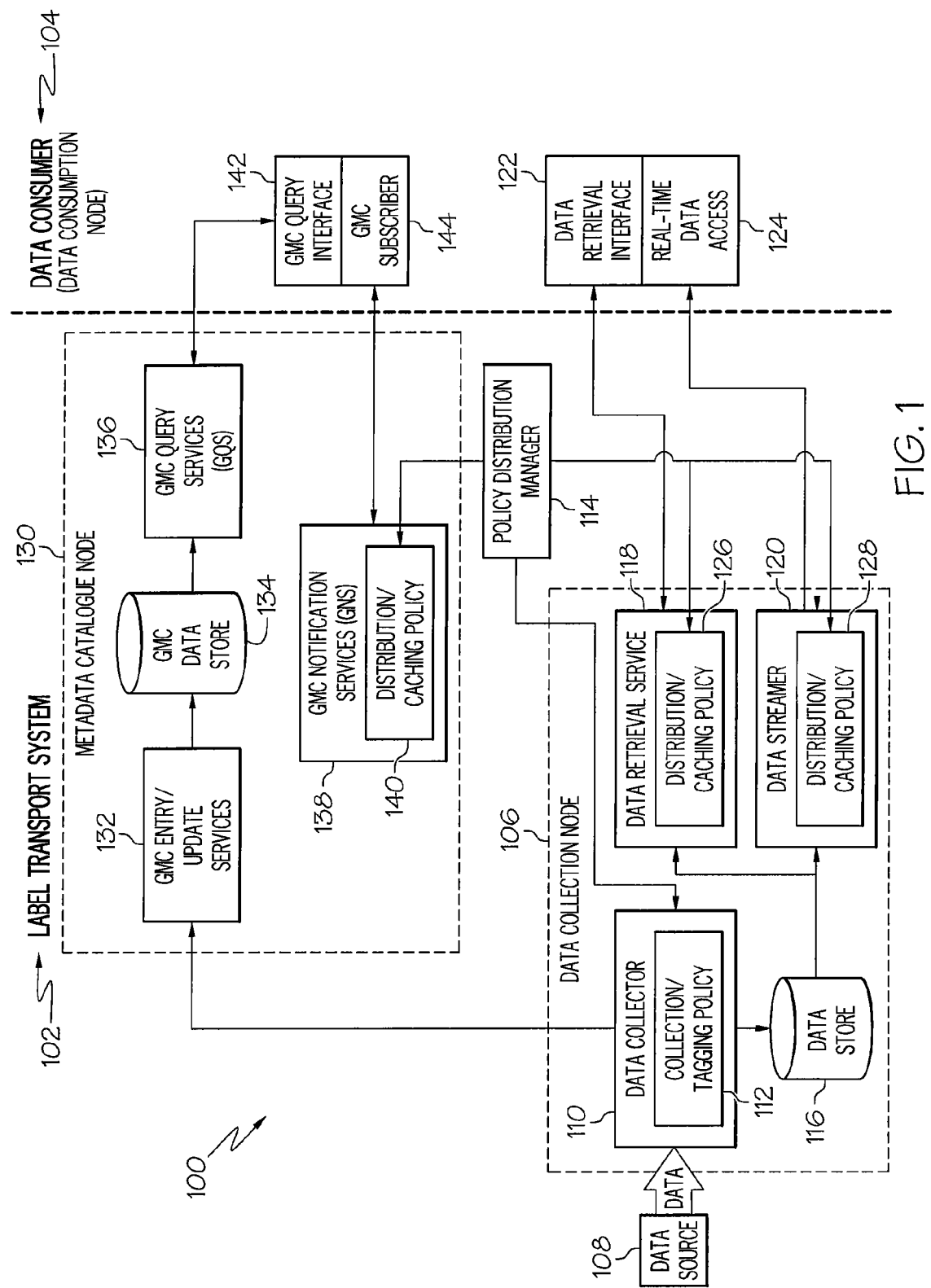
FIG. 1 is a block diagram of an example of a system for data collection, retrieval, and distribution in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, portions of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage devices; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an example of a system 100 for data collection, retrieval, and distribution in accordance with an embodiment of the present invention. The system 100 may include a label transport system 102 and a data consumer 104 or data consumption node. The data consumer 104 may include multiple data consumers or clients and may also be referred to herein as a client or clients. The data consumer may be a human, another system, network, device or the like that may request or be automatically feed the data or selected data for any purpose. As described herein the data consumer 104 may request or retrieve selected data from the label transport system 102 or data may be streamed to the data consumer 104 on a real-time basis for use by the data consumer 104 or client.

The label transport system 102 may include a data collection node 106, or data collection point to collect or receive data from one or more data sources 108. The data collection node 106 may be embodied in a computing device or data processing device or similar device. The system 100 may include a plurality of data collection nodes 106 that may be distributed to more efficiently collect data from multiple distributed data sources 108. The plurality of distributed data collection nodes 106 may define a distributed data collection policy. The data source 108 or sources may be any type of data source or data generating entity, such as a database or database system, another system for performing a certain function, or another network.

The data collection node 106 may include a data collector 110 to collect or receive the data from the data source 108. The data collector 110 may tag or label each group or set of collected or incoming data with a metadata tag or label. The metadata tag may include information about the collected data. For example, the metadata tag may contain a description or summarization of the data. The metadata tag information may also include routing data to a data consumer 104 and/or may include information for caching the data. The routing and/or caching may be done according to a predetermined criteria, policy or strategy. An example of a method for collecting data and tagging the data with a metadata tag in accordance with a embodiment of the present invention will be described with reference to FIG. 3.

A collection/tagging policy 112, module or unit may be associated with the data collector 110. The collection/tagging policy 112 may include policies, parameters, criteria or the like that permit a behavior of the data collector 110 to be dynamically configured for collecting the data, tagging the collected data and generating the metadata tags. Examples of the configurable behavior of the data collector 110 may include how often data is collected and stored; how much data is collected and stored; a format to be used for the metadata tags; how often metadata tags are generated; how specific fields in the metadata tag format will be filled in or completed; assignment of a significance or priority to the collected data; and any other policies that may facilitate the collection and tagging of the collected data and generation of the metadata tags. The collection/tagging policy may be set from a centralized policy distribution manager 114. Accordingly, the collection/tagging policy may be pushed out to the data collection nodes or points 106.

The data collection node 106 may also include a data store 116 or data stores to store or cache the collected data received by the data collector 110. Accordingly, the collected data may be stored at the point of collection. In accordance with the distributed collection strategy of the present invention, the data is stored at the point of collection and may be moved or cached at another location in the system 100 only when needed via a set of distributed caching strategies or distributed caching policy which is discussed in more detail below with reference to FIG. 4.

The data collection node 106 may also include a data retrieval service module 118 and a data streamer module 120. The data retrieval service 118 may retrieve selected data from the data store 116 in response to a request from a data retrieval interface 122 or the like associated with the data consumer 104. The data retrieval interface 122 may be any sort of device for retrieving data, such as a personal computer, personal digital assistant, cellular telephone or other wired or wireless communications device.

The data streamer unit 120 or module may stream or substantially continuously transmit data on a substantially real-time basis to a real-time data access 124 associated with the data consumer 104. The real-time data access 124 may be any type of receiver or device capable of receiving streaming data.

A distribution/caching policy 126, module or unit may be associated with the data retrieval service 118 and another distribution/caching policy 128, module or unit may be associated with the data streamer 120. The distribution/caching policy 126 and 128 may be the same or they may be different policies. While the distribution/caching policy 126 is shown as part of the data retrieval service 118 and the distribution/caching policy 128 is shown as part of the data streamer 120, each of these policies may be a separate component in the data collection node 106 and/or may be combined as a single distribution/caching policy. The distribution/caching policy 126 associated with the data retrieval service 118 may permit the data retrieval service 118 to be dynamically configured to control the retrieval or distribution of data from the data retrieval service 118, such as timing, format, what data is to be distributed, to whom, authorization and other policies that may be appropriate.

The distribution/caching policy 128 associated with the data streamer 120 may permit the data streamer to be dynamically configured to control the steaming of data from the data streamer 120. The distribution/caching policy 128 may control similar parameters to those described with respect to distribution/caching policy 126 for the data retrieval service 118. Both distribution/caching policies 126 and 128 may be set by the centralized policy distribution manager 114.

Once the data has been collected and an associated metadata tag generated, the metadata tag may be sent to a metadata catalogue or metadata catalogue node 130. The metadata catalogue or catalogue node 130 may be embodied in a computing device or data processing device or similar device. The system 100 may include a plurality of metadata catalogue nodes 130 that may be distributed to provide more efficient collection, retrieval and distribution of data. As described in more detail, the distributed metadata catalogue 130 allows searches for the existence and location of data on the system 100.

The metadata catalogue node 130 may include a global metadata catalogue (GMC) entry/update services module 132 to receive metadata tags from the data collector 110. The GMC entry/update services module 132 may receive new metadata tags associated with new data collected by the data collector 110 and may receive updated metadata tags associated updated data collected by the data collector 110.

The metadata catalogue node 130 may include a GMC data store 134 to store the metadata tags received by the GMC entry/updated services module 132. The metadata catalogue node 130 may also include a GMC query services (GQS) module 136 to respond to queries from the data consumer 104 and a GMC notification services (GNS) module 138 to notify a data consumer 104 that has subscribed to receive a specific type of data. A distribution/caching policy 140 may be associated with the GMC notification services 138. A behavior of the GMC notification services 138 may be dynamically configured by the distribution/caching policy 140. As an example, the behavior of the GMC notification services 138 may be configured to determine under what circumstances the data consumer will be notified; what the format for the notification will be; and other parameters that may be related to providing the data consumer notification when a new or updated metadata tag is received by the metadata catalogue node 130.

To use the system 100 to obtain historical data, the data consumer 104 may enter a query into the system 100 through a GMC query interface 142. The GMC query interface 142 may be any type of interface, such as a communications device, personal computer, digital assistant, cellular telephone or other wired or wireless device capable of interfacing with a network or the system 100. An example of a method to obtain data using the GMC query services 136 will be described with reference to FIG. 5 below.

The GMC notification services 138 may listen or detect a new or updated metadata tag being entered into the GMC data store 134 by the GMC entry/update services module 132. The GMC notification services 138 may then send a notice to a GMC subscriber 144 who has subscribed or registered a query with the GMC notification services 138 to receive notification of any new or updated metadata tags corresponding to the query. An exemplary method to listen for a new or updated metadata tag and to send a notice to a subscriber 144 will be described with reference to FIG. 6 below.

Figure 2:
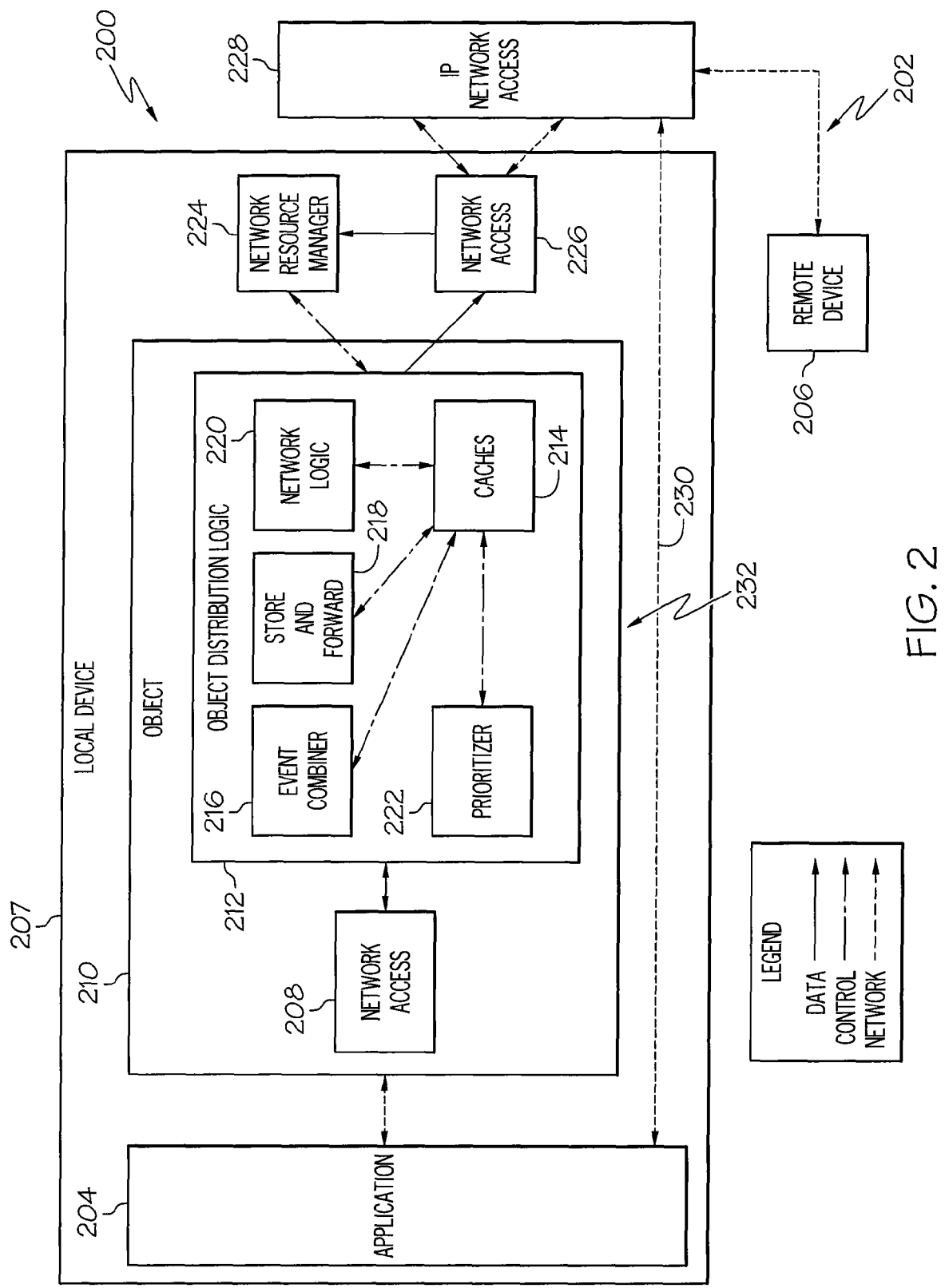
FIG. 2 is a block diagram of an example of a system for transmitting data over a network from an application to a remote device in accordance with an embodiment of the present invention

FIG. 2 is a block diagram of an example of a system 200 for transmitting data over a network 202 from an application 204 to a remote device 206 in accordance with an embodiment of the present invention. The system 200 may be embodied in the system 100 of FIG. 1. For example, the application 204 may correspond to the data source 108 or data collection node 106 in FIG. 1. The remote device 206 may correspond to the data consumer 104 or metadata catalogue node 130. The remote device 206 may also be an intermediate data cache or data store, such a data store 116 in FIG. 1 or GMC data store 134 in FIG. 1. The application 204 may also be any application or entity that uses a network 202 and the remote device 206 may be any device or application that the application 204 needs to communicate with.

The application 204 may be contained or operable on a local device 207. The local device 207 may be a computing device, data processing device or similar device. The application 204 may interface with a network access module 208 embodied on an object 210. The object 210 may be an instance of a software object to provide access to the network 202. The network access 208 may provide a facade for the application 204. The facade technique allows data caching to be inserted into the path or operation of existing software without changing that software. The facade works by using additional Internet Protocol (IP) addresses to seamlessly plug-in under existing applications.

The network access facade 208 may transfer the data to object distribution logic 212. The object distribution logic may include one or more caches 214 to store the data. The object distribution logic 212 may also include an event combiner 216, a store and forward mechanism 218, a network logic module 220 and a prioritizer 222. These components may interface with the cache 214 or caches. The event combiner 216 may combine a plurality of event updates into a single event. The events may be held in the same caches. Events may be combined such that the latest events are transmitted and older or unnecessary events are removed from a transmission queue.

The store and forward mechanism 218 may include a configurable timing mechanism. The mechanism 218 provides store and forward functionality in the case of loss of network connectivity. When network connectivity is lost, the store and forward mechanism 218 may hold the data in cache until the network becomes available again. The mechanism 218 may also include logic to age out or remove the oldest data.

The prioritizer 222 uses configuration parameters to reorder messages for transmission. The prioritizer may work on data held in the same caches. The data may be re-ordered so that higher priority data will tend to be sent first.

The network logic module 220 may take into account network resource management, prioritized messages and activity by the store and forward mechanism 218 to determine what messages to send. The network logic module 220 may include compression algorithms to compact the data for more efficient transmission.

The local device 207 may also include a network resource manager 224. The network resource manager 224 may interface with the object distribution logic and may provide data or information about current loading and status of the network 202 for more efficient transmission of data across the network 202. Another network access 226 may provide input to the network resource manager 224. The network access 226 may interface with an IP network access unit 228. Control data may be exchanged between the network access 226 and the IP network access 228 for transmission of data to the remote device 206.

Typically, the application 204 would access the IP network via a path 230. However, the path 232 including the components described above can provide better network management and reliable transmission of data.

Figure 3:
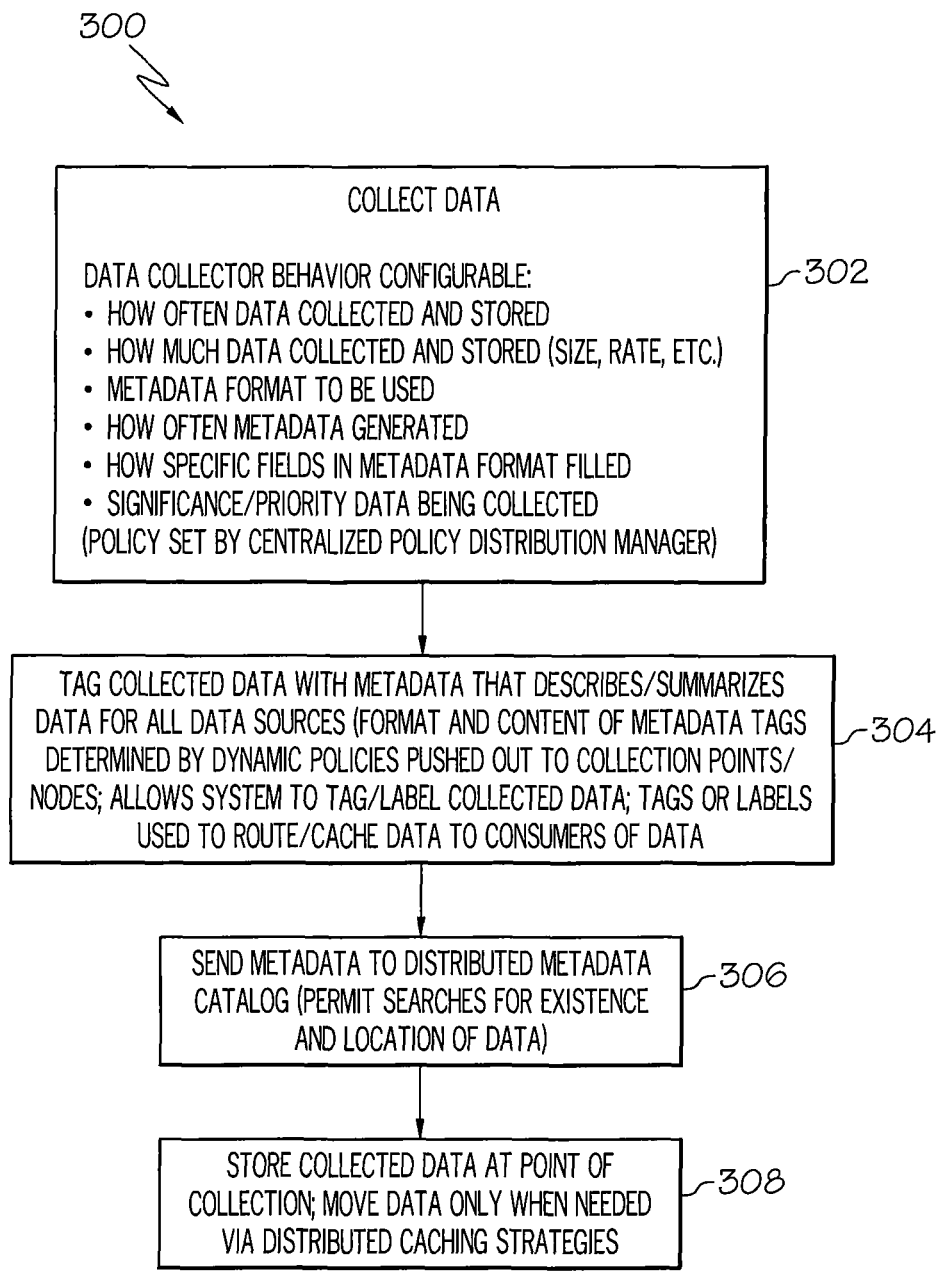
FIG. 3 is a flow chart of an example of a method for collecting and tagging or labeling data in accordance with an embodiment of the present invention.

FIG. 3 is a flow chart of an example of a method 300 for collecting and tagging or labeling data in accordance with an embodiment of the present invention. The method 300 may be embodied in the data collector 110 of data collection node 106 of FIG. 1. In block 302, the data collector behavior may be configured similar to that previously described. Configuration of the data collector may include: how often data is collected and stored; how much data is collected and stored (size, rate, etc.); metadata format to be used for metadata tags; how often metadata will be generated; how specific fields in the metadata format will be filled in or completed; assigning a significance or priority of data being collected; or other parameters that may be useful for the collection of data.

In block 304, the collected data may be tagged with a metadata tag or label. The metadata tag may describe or summarize the data from each data source or each group or set of data from a data source. The format and content of the metadata tags may be determined by dynamic policies that are pushed out to the collection points. As described with respect to the system 100 of FIG. 1, collection/tagging policies 112 may be set by the policy distribution manager 114. This allows the system to tag or label the collected data from each data source and/or each group or set of data from each data source. The metadata tags or labels may also be used to route data to data consumers and/or to cache data at certain locations in the system or network according to a distributed caching strategy or policy.

In block 306, the metadata tags may be sent to a distributed metadata catalogue structure. The metadata catalogue structure or architecture allows searches for the existence and location of the data, corresponding to the metadata tags, on the system or network.

In block 308, the collected data may be stored at the point of collection similar to that previously described. The data may be moved to a new location on the network or system when needed and according to the distributed caching strategy.

Figure 4:
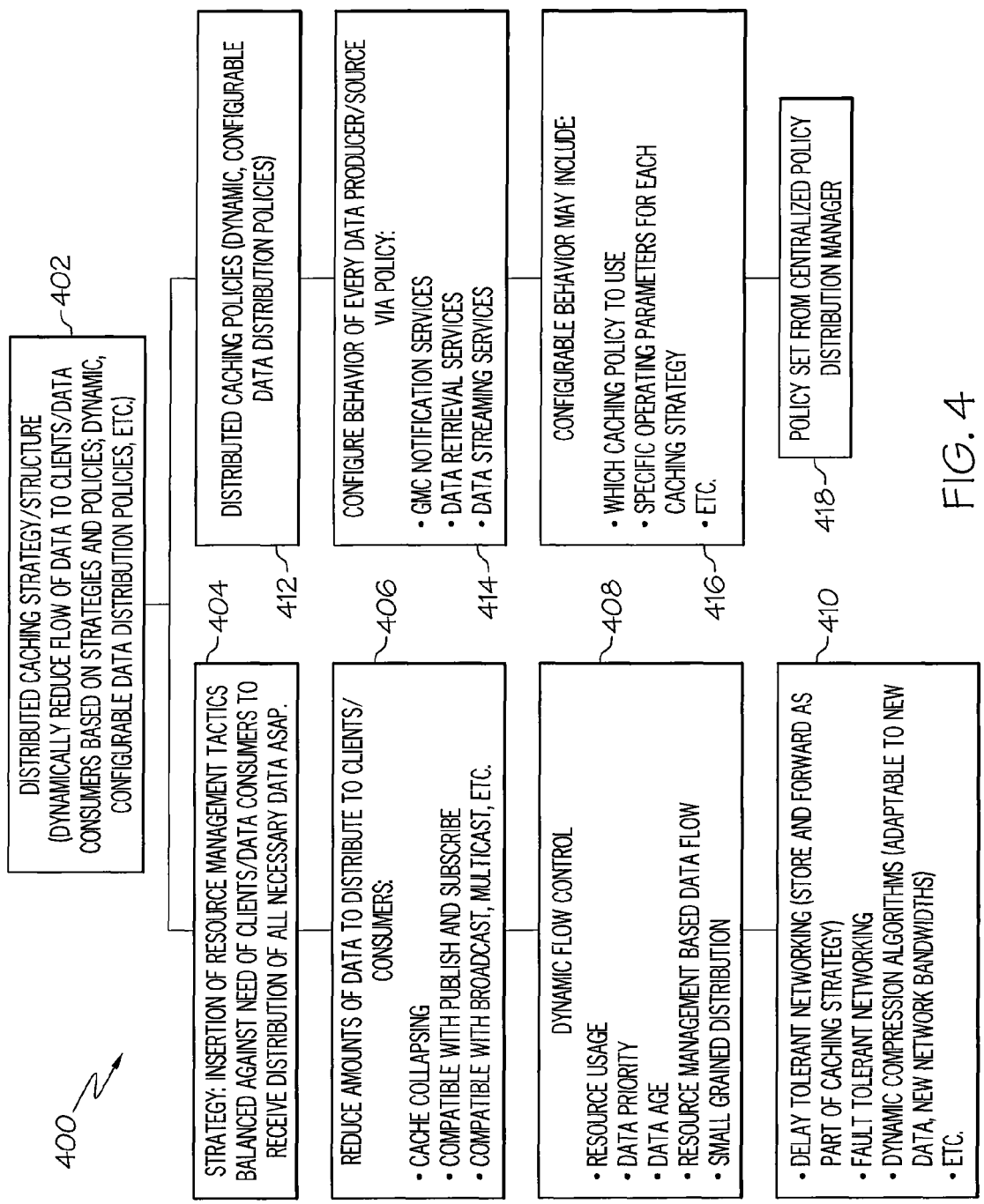
FIG. 4 is a diagram of an example of a distributed caching strategy or structure and distributed caching policy in accordance with an embodiment of the present invention.

FIG. 4 is a diagram of an example of a distributed caching strategy or structure 400 and distributed caching policy in accordance with an embodiment of the present invention. In block 402, the distributed caching strategy or structure 400 is formed to dynamically reduce a flow of data to clients or data consumers. The reduction in data flow may be based on strategies and policies, examples of which are described further. The strategies and policies may also include a dynamic, configurable data distribution policy to facilitate reducing the flow of data to clients or data consumers.

In block 404, the strategy may include insertion of resource management tactics. The resource management tactics are balanced against a need of all clients or data consumers to receive distribution of all desired or necessary data in a timely manner or as soon as possible depending upon the application or circumstances. Examples of resource management may involve sensing how much a resource, such as a network, is being utilized; evaluating a history and predicting futures on resource availability; using configurable algorithms or other mechanisms to change resource or network capacities; selecting among different resources if more than one is available; determining resource availability; and other parameters that allow management of a resource, such as a network.

In block 406, amounts of data to distribute to data consumers may be reduced. The number of consumers receiving data may also be reduced under some circumstances and in some embodiments of the present invention. Examples of mechanisms that may be used for reducing amounts of data to distribute to clients or data consumers and the number of clients or data consumers receiving the data may include cache collapsing; nature of the data or circumstances are compatible with publish and subscribe parameters; nature of data or circumstances are compatible with broadcast, multicast; and other mass distribution. Cache collapsing may involve only sending updated portions of data rather than the entire data set. Compatibility with publish and subscribe parameters may involve only sending selected data to those data consumers who have indicated an interest or have subscribed to receive the selected data. Compatibility with broadcast and multicast involves only transmitting the data to all data consumers or multiple data consumers when the nature of the data is appropriate for such large scale distribution or circumstances suggest such large scale distribution is appropriate or desired.

In block 408, another strategy to reduce the flow of data to clients or data consumers may involve dynamic flow control. Dynamic flow control may be based on several factors, such as resource usage, data priority, data age, resource management based data flow, small grained distribution, and other mechanisms that may allow the flow of data to be dynamically controlled. As examples of these factors, more reliable resources may be more heavily utilized. Data may be prioritized and higher priority data may be distributed before lower priority data. As previously discussed, older data may be less reliable or useful and therefore may be removed or deleted. Small grain distribution may involve only sending those portions of the data that are needed or provide useful information for the data consumer.

In block 410, the distributed caching strategy or structure 400 may also include providing delay tolerant networking, fault tolerant networking, dynamic compression algorithms or the like. An example of a delay tolerant network may include a store and forward feature similar to store and forward mechanism 218 described with reference to FIG. 2. The collected data may also be stored and prioritized so delivery delays have less of an impact. A fault tolerant network may include redundant components. Dynamic compression algorithms permit compression of data for more efficient caching and/or distribution and adaptability to new data and new or changing network bandwidths.

Block 412 may include distributed caching policies. Similar to the distribution/caching policies described with respect to FIG. 1, the policies may be dynamic and configurable to adjust to different types of data and circumstances.

In block 414, as part of the distributed caching strategy/structure 400, the behavior of every data producer or data provider may be configured via a distribution/caching policy. Examples of the data producers or data providers may be the data collection node 106 and metadata catalogue node 130 of FIG. 1. Accordingly, similar to that previously discussed, the behavior of each GMC notification services 138 in each metadata catalogue node 130, and the behavior of each data retrieval services 118 and data streaming services 120 in each data collection node 106 may be configured using the respective distribution/caching policy associated with each GMC notification services module 138, data retrieval services module 118 and data streamer module 120.

In block 416, the configurable behavior may include which caching policy to use, specific operating parameters for each caching strategy and any other configurable parameters to control operation of these components.

In block 418, the distribution caching strategy/structure 400 may include a centralized policy distribution manager to set policy. The policy distribution manager may be the same as the policy distribution manger 114 of FIG. 1.

Figure 5:
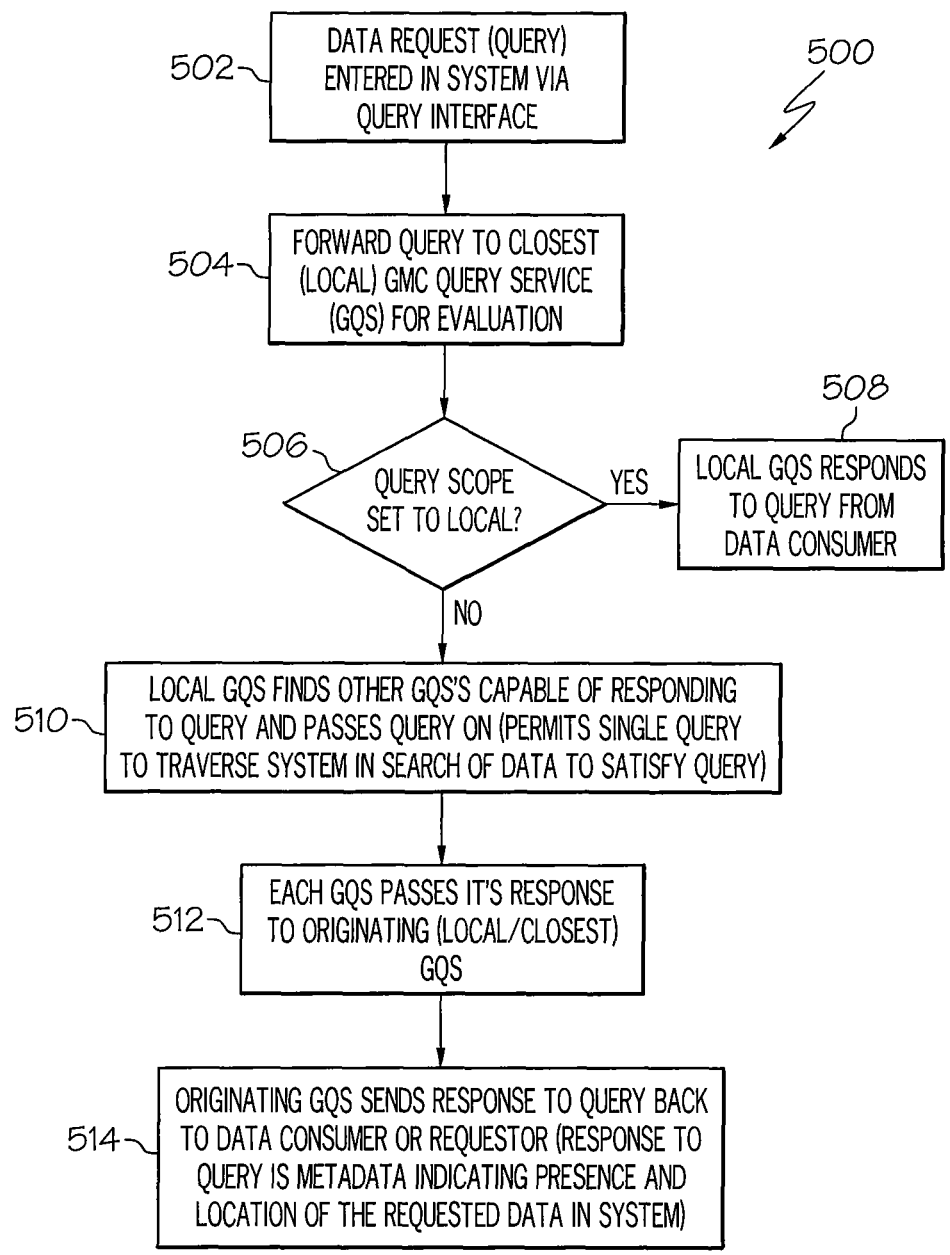
FIG. 5 is a flow chart of an example of a method to obtain data in accordance with an embodiment of the present invention.

FIG. 5 is a flow chart of an example of a method 500 to obtain data in accordance with an embodiment of the present invention. The method 500 may be embodied in or performed by the system 100 of FIG. 1. In block 502, a data request or query may be entered in the system via a query interface. The query interface may be similar to the GMC query interface 142 described with reference to FIG. 1.

In block 504, the query may be forwarded to the closest, most immediate or local GMC query service (GQS) module for evaluation. The GQS module may be similar to the GMC query services (GQS) module 136 of FIG. 1. The closest or local GQS may be the GQS that is the shortest distance from the data consumer that may be able to properly and efficiently respond to the query. The closest or local GQS may also be the GQS to which any query from this particular data consumer is directed based on the data distribution and caching strategies and policies.

In block 506, a determination may be made if a scope of the query is set to "local". If the query scope has been set to local, the local or closest GQS module may respond to the query in block 508. If the query scope has not been set to local, the method 500 may advance to block 510.

In block 510, the local GQS may find other GQS's capable of responding to the query and may pass the query on to those GQS's. This feature of the embodiment of the present invention permits a single query to traverse the system in search of data to satisfy the query.

In block 512, each GQS passes it's response to the originating or local GQS. In block 514, the originating or local GQS may send the response to the query back to the data consumer or requester. The response to the query may be metadata indicating a presence and location of the requested data on the system or network.

Figure 6:
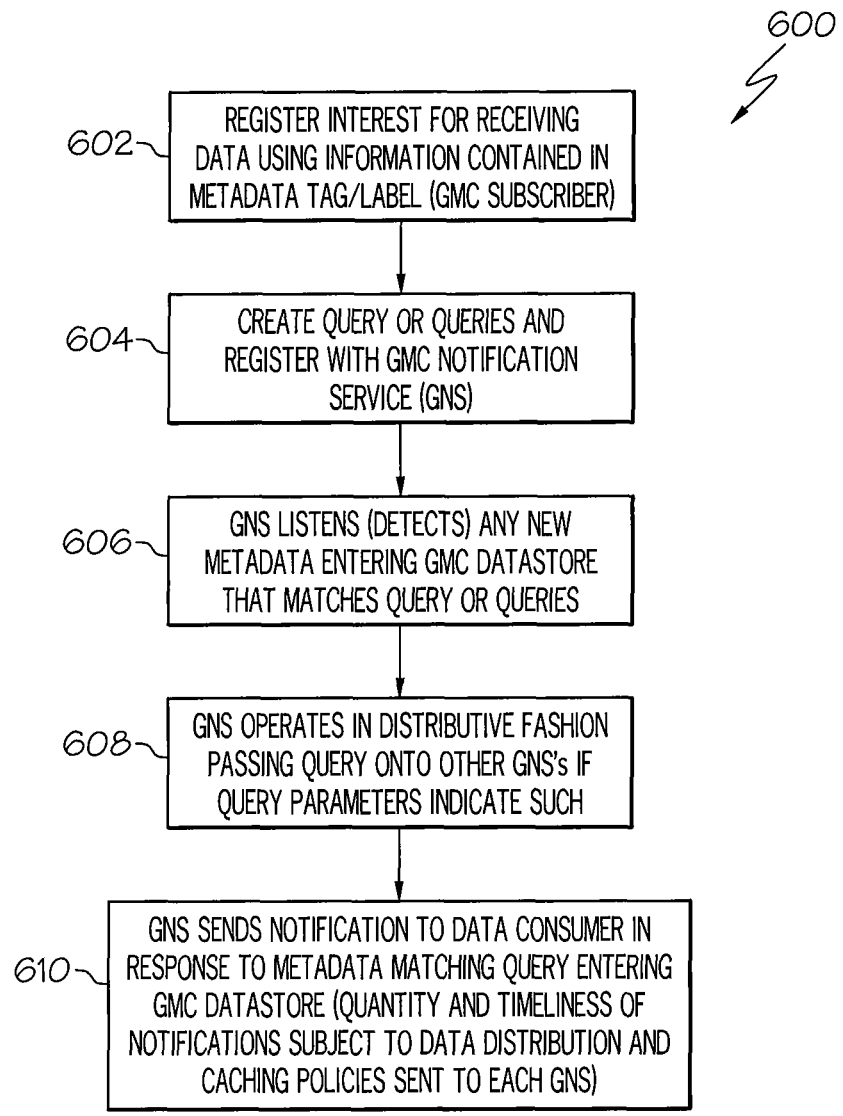
FIG. 6 is a flow chart of an example of a method to listen for new data and to notify a data consumer or subscriber in accordance with an embodiment of the present invention.

FIG. 6 is a flow chart of an example of a method 600 to listen for new data and provide notification to a data consumer in accordance with an embodiment of the present invention. The method 600 may be embodied in or performed by the system 100 of FIG. 1, such as in the GMC notification services module 138. In block 602, a data consumer or GMC subscriber may register an interest for receiving a certain type of information contained in a metadata tag or label. In block 604, the query or queries may be created and registered with the GMC notification service, such as GMC notification service module 138 in FIG. 1.

In block 606, the GMC notification service module (GNS) may listen or detect any new metadata entering the GMC data store, such as data store 134 that matches the query or queries. As indicated in block 608, the GNS may operate in a distributive fashion and pass the query onto other GNS's if the query parameters indicate that another GNS could more appropriately or more efficiently listen for new metadata that may satisfy the query.

In block 610, the GNS may send notification to the data consumer in response to a metadata tag or other metadata matching the query being entered into the GMC data store. The quantity and timeliness of the notification may be subject to the data distribution and caching policies sent to each GNS. If the GNS has forwarded the query to another GNS under the distributive data feature of the present invention, the other GNS may send the notification back to the local or originating GNS to pass the notification back to the data consumer.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for collection, retrieval, and distribution of data, comprising:
   a computing device comprising a processor and a memory;
   a data collector embodied in the computing device to collect data from at least one data source and to tag each group of collected data with an associated metadata tag, wherein the metadata tag includes information about the collected data;
   an object distribution logic module associated with the data collector, the object distribution logic module comprising one or more caches to store data and a distributed caching strategy structure, the distributed caching strategy structure including a cache collapsing module to only send updated portions of data rather than an entire data set in accordance with data consumer submitted information and a store and forward feature to dynamically reduce flow of the data to data consumers;
   at least one other computing device;
   at least one distributed metadata catalogue embodied in the at least one other computing device for containing a plurality of metadata tags, wherein the metadata tags without any associated groups of collected data are stored on the at least one distributed metadata catalogue, wherein only metadata indicating the existence and location of a requested group of data on a network is sent to a requester in response to a data request corresponding to the requested group of data associated with the metadata tag to avoid sending the requested group of data over the network until needed; and
   wherein the at least one distributed metadata catalogue comprises a metadata catalogue query services module configured to receive a query from the data consumer, wherein the query is received by a local metadata catalogue query services module of the at least one distributed metadata catalogue that is a closest distance from the data consumer, the local catalogue query services module is configured to determine if a scope of the query is set to local, the local catalogue query services module responding to the query in response to the scope of the query being set to local and the local catalogue query services module passing the query to another catalogue query services module of another distributed metadata catalogue capable of responding to the query.

2. The system of claim 1, further comprising a collection/tagging policy associated with the data collector for dynamically configuring a behavior of the data collector in collecting data, tagging the collected data and generating the metadata tags.

3. The system of claim 2, wherein the behavior of the data collector comprises:
   how often data is collected and stored;
   how much data is collected and stored;
   a format to be used for the metadata tags;
   how often metadata tags are generated;
   how specific fields in the metadata tag format will be filled in; and
   assignment of a significance or priority to the data collected.

4. The system of claim 2, further comprising a policy distribution manager to set the collection/tagging policy.

5. The system of claim 1, wherein the information about the collected data included in the metadata tag comprises at least one of a description of the data and a summary of the data.

6. The system of claim 1, wherein the metadata tag comprises information for at least one of routing data to a consumer of the data and caching the data according to predetermined criteria.

7. The system of claim 1, further comprising a data store associated with the data collector at a data collection node to store the collected data, wherein the collected data is only moved in accordance with a distributed caching policy.

8. The system of claim 1, further comprising a distributed data collection structure including a plurality of data collection nodes, each data collection node comprising a data collector.

9. The system of claim 1, further comprising:
   a metadata node to respond to a metadata catalogue query and to distribute metadata catalogue information to the data consumers; and
   a distributed caching policy to configure a behavior of the metadata node.

10. The system of claim 1, wherein the network comprises a delay and fault tolerant network to distribute data to a data consumer, wherein the network is delay tolerant by storing and prioritizing the data to reduce an impact of any delivery delays.

11. The system of claim 1, wherein the metadata catalogue comprises:
   a metadata catalogue data store for storing the plurality of metadata tags.

12. The system of claim 1, further comprising a metadata entry/update services module to receive any new and updated metadata tags from the data collector.

13. The system of claim 1, further comprising a data retrieval service module to distribute data collected by the data collector to a data consumer based on a distribution/caching policy.

14. The system of claim 1, further comprising a data streamer to publish selected data collected by the data collector to a data consumer that has subscribed to receive the selected data based on a distribution/caching policy.

15. The system of claim 1, further comprising a mechanism to cache data collected by the data collector and to transport selected data across the network in response to a request, wherein the selected data is cached at a new system location to service subsequent requests.

16. The system of claim 1, further comprising a network resource manager to provide data about current loading and status of the network and for managing use of bandwidth on the network to transfer data from a data collection node to a data consumption node.

17. The system of claim 1, further comprising a network access mechanism for accessing the network and transmitting data across the network, wherein the network access mechanism is capable of being plugged-in between an application and the network to provide seamless network management.

18. The system of claim 1, further comprising a prioritizer to reorder data collected by the data collector and stored in a cache so that data with a higher priority is transmitted first.

19. The system of claim 1, further comprising a store and forward mechanism to hold data in a cache until the network for transmitting the data becomes available in response to a loss of network connectivity and to remove data from the cache that is beyond a predetermined age.

20. The system of claim 1, further comprising a mechanism to adapt to changing network bandwidths using a set of configuration parameters.

21. The system of claim 1, further comprising an event combiner to combine event updates on a single event for transmission and to remove older and any unnecessary events from a queue.

22. The system of claim 1, further comprising:
a configurable distributed caching structure to dynamically reduce a flow of data to a plurality of data consumers based on a set of predetermined strategies and policies, wherein the policies include a set of dynamic, configurable data distribution/caching policies, and wherein the set of predetermined strategies and policies comprises:
cache collapsing to reduce an amount of data to be distributed to data consumers by sending only an updated portion of data rather than an entire data set; and
dynamic flow control to reduce the amount of data to be distributed based on a group of factors including usage of the data source, priority of the data, age of the data, resource management based on data flow, smart caching, and small grained distribution of data.

23. The system of claim 1, wherein the at least one metadata catalogue comprises a plurality of distributed metadata catalogues, the data request being sent to the metadata catalogue that is a shortest distance from the requester.

24. The system of claim 1, wherein the other catalogue query services module is configured to send a response to the query to the local catalogue query services module and the local catalogue query services module is configured to send the response to the query to the data consumer.

25. The system of claim 1, further comprising a metadata notification services module to listen for new metadata entering the metadata catalogue and to notify a data consumer if the new metadata corresponds to a query previously registered with the metadata notification services module by the data consumer, wherein the metadata notification services module is operable in a distributed manner to pass any query to another metadata notification services module that can best respond to the query.

26. A system for collection, retrieval, and distribution of data, comprising:
a plurality of computing devices;
a configurable distributed data collection and caching structure including a plurality of data collection nodes, each data collection node being embodied in a respective one of the plurality of computing devices and each data collection node comprising a data collector to collect data from at least one data source and to tag each group of collected data with an associated metadata tag, wherein the metadata tag includes information about the collected data;
an object distribution logic module associated with the configurable data collection and caching structure, the object distribution logic module comprising one or more caches to store data and a distributed caching strategy structure, the distributed caching strategy structure including a cache collapsing module to only send updated portions of data rather than an entire data set in accordance with data consumer submitted information and a store and forward feature to dynamically reduce flow of the data to data consumers;
at least one data processing device comprising a processor and a memory;
at least one distributed metadata catalogue node embodied in the at least one data processing device, the at least one metadata catalogue node comprising:
a metadata catalogue data store for storing a plurality of metadata tags without any associated groups of collected data, each group of collected data being associated with one of the plurality of metadata tags;
a metadata catalogue query services module to receive and respond to a query from the data consumer, wherein a response to the query includes only metadata indicating the existence and location in the system of data corresponding to the query to avoid moving the data corresponding to the query over a network unless needed; and
wherein the query is received by a local metadata catalogue query services module of the at least one distributed metadata catalogue node that is a closest distance from the data consumer, the local catalogue query services module is configured to determine if a scope of the query is set to local, the local catalogue query services module responding to the query in response to the scope of the query being set to local and the local catalogue query services module passing the query to another catalogue query services module of another distributed metadata catalogue node capable of responding to the query.

27. The system of claim 26, a collection/tagging policy function associated with the data collector for dynamically configuring a behavior of the data collector in collecting data, tagging the collected data and generating the metadata tags.

28. The system of claim 26, wherein each data collection node comprises a data store to store the collected data, wherein the collected data is only moved in accordance with a distribution/caching policy.

29. The system of claim 26, further comprising:
a data retrieval service module to distribute selected data collected by the data collector to a data consumer that has requested the selected data, wherein the selected data is retrieved based on a distribution/caching policy;
a data streamer to publish chosen data collected by the data collector to the data consumer or another data consumer that has subscribed to receive the chosen data based on the distribution/caching policy; and
a policy distribution manager to set the distribution/caching policy.

30. A method for collection, retrieval, and distribution of data, comprising:
collecting data from at least one data source by a data collector embodied in a computing device, the computing device comprising a processor and a memory, wherein an object distribution logic module is associated with the data collector, the object distribution logic module comprising one or more caches to store data and a distributed caching strategy structure, the distributed caching strategy structure including a cache collapsing module to only send updated portions of data rather than an entire data set in accordance with data consumer submitted information and a store and forward feature to dynamically reduce flow of the data to data consumers;
tagging each group of collected data by the data collector with an associated metadata tag that includes at least one of a location of the group of data associated with the metadata tag on a system, a description of the group of data associated with the metadata tag, and a summary of the group of data associated with the metadata tag;
forming at least one distributed metadata catalogue embodied in at least one other computing device, the at least one distributed metadata catalogue containing a plurality of metadata tags without any associated groups of data, wherein only metadata indicating the existence and location of a requested group of data on the system is sent to a requester in response to a data request corresponding to the requested group of data associated with the metadata tag to avoid sending the requested group of data over a network until needed; and wherein the at least one distributed metadata catalogue comprises a metadata catalogue query services module configured to receive a query from the data consumer, wherein the query is received by a local metadata catalogue query services module of the at least one distributed metadata catalogue that is a closest distance from the data consumer, the local catalogue query services module is configured to determine if a scope of the query is set to local, the local catalogue query services module responding to the query in response to the scope of the query being set to local and the local catalogue query services module passing the query to another catalogue query services module of another distributed metadata catalogue capable of responding to the query.

31. The method of claim 30, further comprising allowing dynamic configuration of a data collector, wherein allowing dynamic configuration of the data collector comprises:
   allowing configuration of how often data is collected and stored;
   allowing configuration of how much data is collected and stored;
   allowing configuration of a format to be used for the metadata tags;
   allowing configuration of how often metadata tags are generated;
   allowing configuration of how specific fields in the metadata tag format will be filled in; and
   allowing assignment of a significance or a priority to each group of data collected.

32. The method of claim 30, further comprising:
   storing the collected data at a point of collection; and
   moving the data when needed in accordance with a distributed caching policy.

33. A computer program product for collection, retrieval, and distribution of data, the computer program product comprising:
   a non-transitory computer readable storage medium having computer usable program code embodied therewith, the computer usable medium comprising:
   computer usable program code configured to collect data from at least one data source by a data collector, wherein an object distribution logic module is associated with the data collector, the object distribution logic module comprising one or more caches to store data and a distributed caching strategy structure, the distributed caching strategy structure including a cache collapsing module to only send updated portions of data rather than an entire data set in accordance with data consumer submitted information and a store and forward feature to dynamically reduce flow of the data to data consumers;
   computer usable program code configured to tag each group of collected data with an associated metadata tag that includes at least one of a location of the data associated with the metadata tag on the system, a description of the data associated with the metadata tag, and a summary of the data associated with the metadata tag;
   computer usable program code configured to form at least one distributed metadata catalogue containing a plurality of metadata tags without any associated groups of data, wherein only metadata indicating the existence and location of a requested group of data on the system is sent to a requester in response to a data request corresponding to the requested group of data associated with the metadata tag to avoid sending the requested group of data over a network until needed; and
   wherein the at least one distributed metadata catalogue comprises a metadata catalogue query services module configured to receive a query from the data consumer, wherein the query is received by a local metadata catalogue query services module of the at least one distributed metadata catalogue that is a closest distance from the data consumer, the local catalogue query services module is configured to determine if a scope of the query is set to local, the local catalogue query services module responding to the query in response to the scope of the query being set to local and the local catalogue query services module passing the query to another catalogue query services module of another distributed metadata catalogue capable of responding to the query.

34. The computer program product of claim 33, further comprising computer usable program code configured to allow dynamic configuration of a data collector, wherein the computer usable program code configured to allow dynamic configuration of the data collector comprises:
   computer usable program code configured to allow configuration of how often data is collected and stored;
   computer usable program code configured to allow configuration of how much data is collected and stored;
   computer usable program code configured to allow configuration of a format to be used for the metadata tags;
   computer usable program code configured to allow configuration of how often metadata tags are generated;
   computer usable program code configured to allow configuration of how specific fields in the metadata tag format will be filled in; and
   computer usable program code configured to allow assignment of a significance or a priority to each group of data collected.

* * * * *